US012682363B2

(12) United States Patent
Kim et al.

(10) Patent No.: US 12,682,363 B2
(45) Date of Patent: Jul. 14, 2026

(54) FLUORESCENT SILK INFORMATION CODE RECOGNIZING METHOD AND APPARATUS USING THE SAME

(71) Applicants: REPUBLIC OF KOREA (MANAGEMENT: RURAL DEVELOPMENT ADMINISTRATION), Jeonju-si (KR); PURDUE RESEARCH FOUNDATION, West Lafayette, IN (US)

(72) Inventors: Seong Wan Kim, Jeollabuk-do (KR); Kee Young Kim, Jeollabuk-do (KR); Nam Sup Kim, Jeollabuk-do (KR); Seong Ryul Kim, Jeollabuk-do (KR); Sang Kug Kang, Jeollabuk-do (KR); Jong Woo Park, Jeollabuk-do (KR); Chan Young Jung, Jeollabuk-do (KR); Young L. Kim, West Lafayette, IN (US); Jungwoo Leem, West Lafayette, IN (US); Heejae Jeon, Seoul (KR); Sang Mok Park, West Lafayette, IN (US); Yuhyun Ji, Lansdale, PA (US)

(73) Assignees: REPUBLIC OF KOREA (MANAGEMENT: RURAL DEVELOPMENT ADMINISTRATION, Jeollabuk-Do (KR); PURDUE RESEARCH FOUNDATION, West Lafayette, IN (US)

( * ) Notice: Subject to any disclaimer, the term of this patent is extended or adjusted under 35 U.S.C. 154(b) by 101 days.

(21) Appl. No.: 18/712,404

(22) PCT Filed: Apr. 5, 2023

(86) PCT No.: PCT/KR2023/004629
§ 371 (c)(1),
(2) Date: May 22, 2024

(87) PCT Pub. No.: WO2023/195786
PCT Pub. Date: Oct. 12, 2023

(65) Prior Publication Data
US 2026/0111916 A1     Apr. 23, 2026

(30) Foreign Application Priority Data

Apr. 7, 2022    (KR) ........................ 10-2022-0043658
Jun. 23, 2022   (KR) ........................ 10-2022-0076848

(51) Int. Cl.
*G06Q 30/018*      (2023.01)
*G06K 7/14*        (2006.01)
(Continued)

(52) U.S. Cl.
CPC ........... *G06Q 30/0185* (2013.01); *G06K 7/14* (2013.01); *G06K 19/10* (2013.01); *H04L 9/0643* (2013.01)

(58) Field of Classification Search
CPC ........ G06Q 30/185; G06K 7/14; G06K 19/10; H04L 9/0643
See application file for complete search history.

(56) References Cited

U.S. PATENT DOCUMENTS 10,691,909 B2    6/2020 Kim et al.
2015/0120423 A1*  4/2015 Farn .................. G06K 19/0614
235/494
(Continued)

FOREIGN PATENT DOCUMENTS

JP        2014029678 A    2/2014
JP        2022039930 A    3/2022
(Continued)

OTHER PUBLICATIONS

International Search Report for International Application No. PCT/KR2023/004629, Filing Date: Apr. 5, 2023, Date of Mailing: Jul. 10, 2023, 2 pages.
(Continued)

Primary Examiner — Matthew Mikels

(74) *Attorney, Agent, or Firm* — CANTOR COLBURN LLP

(57) ABSTRACT

A fluorescent silk information code recognizing method includes a process of scanning a fluorescent silk information code which is affixed or included in a product, using a camera; a process of extracting a binary output key from the scanned fluorescent silk information code using a trained artificial intelligence model; and a process of authenticating the product using the extracted binary output key.

8 Claims, 10 Drawing Sheets

(51) Int. Cl.
  *G06K 19/10*        (2006.01)
  *H04L 9/06*         (2006.01)

(56) References Cited

U.S. PATENT DOCUMENTS

| | | | |
|---|---|---|---|
| 2016/0325579 A1* | 11/2016 | Ramesh Sharma | ....... D01F 1/06 |
| 2017/0189557 A1 | 7/2017 | Park et al. | |
| 2018/0137329 A1 | 5/2018 | Kim et al. | |
| 2022/0067568 A1 | 3/2022 | Hemmatiyan et al. | |

FOREIGN PATENT DOCUMENTS

| | | |
|---|---|---|
| KR | 101640499 B1 | 7/2016 |
| KR | 1020180052900 A | 5/2018 |
| KR | 20190093640 A | 8/2019 |
| KR | 102124568 B1 | 6/2020 |
| KR | 20200136239 A | 12/2020 |

OTHER PUBLICATIONS

Leem et al., 'Edible unclonable functions', Nature Communications vol. 11, Article No. 328 (2020) 11 pages.

* cited by examiner

<FIG. 1>
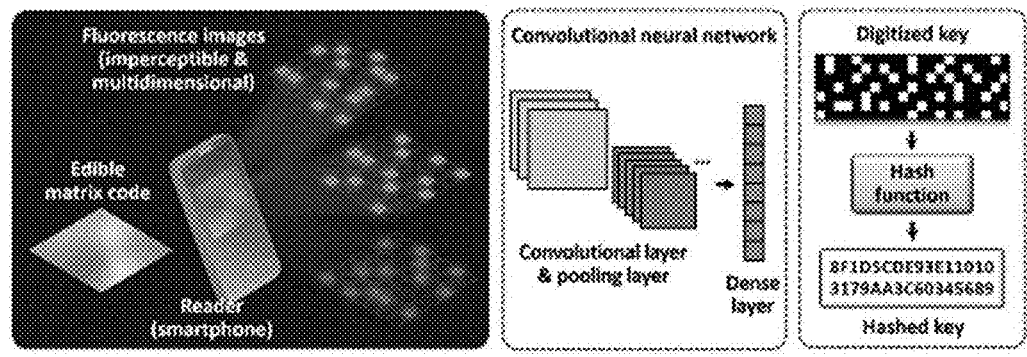
<FIG. 2>
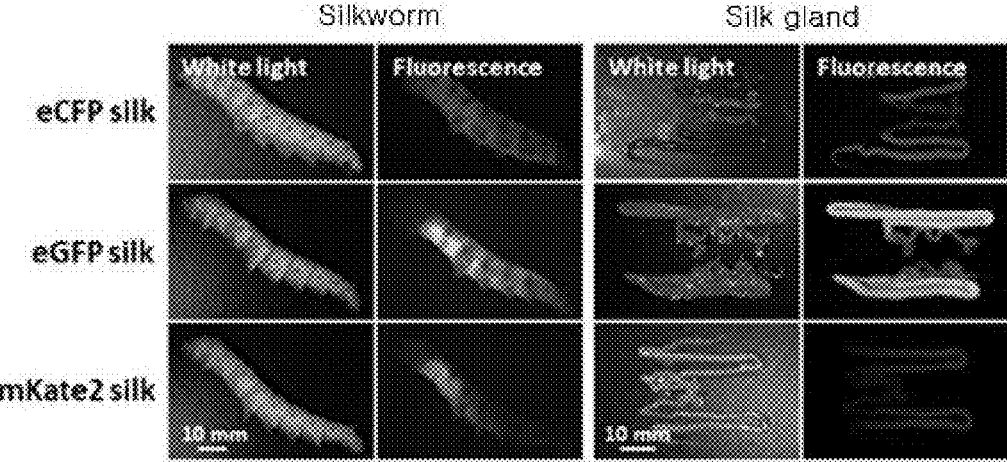
<FIG. 3A>
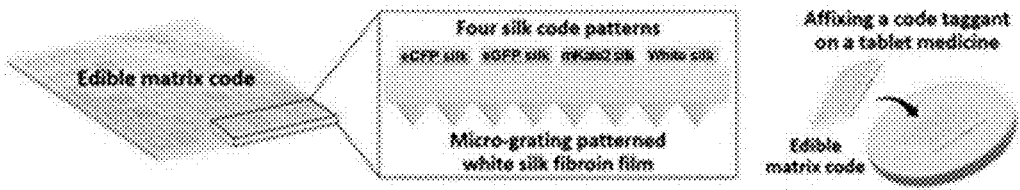

<FIG. 3B>
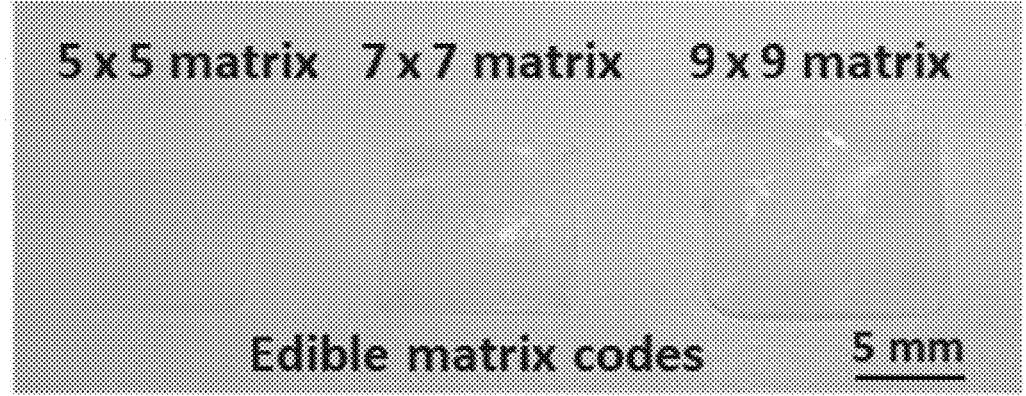
<FIG. 4A>
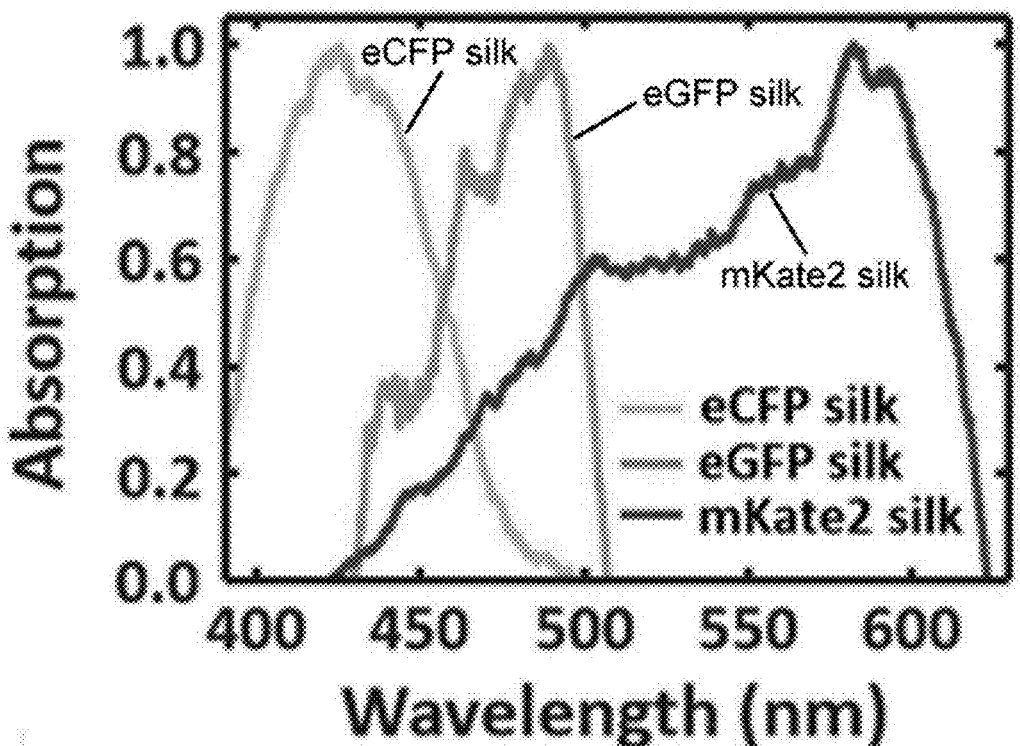

<FIG. 4B>
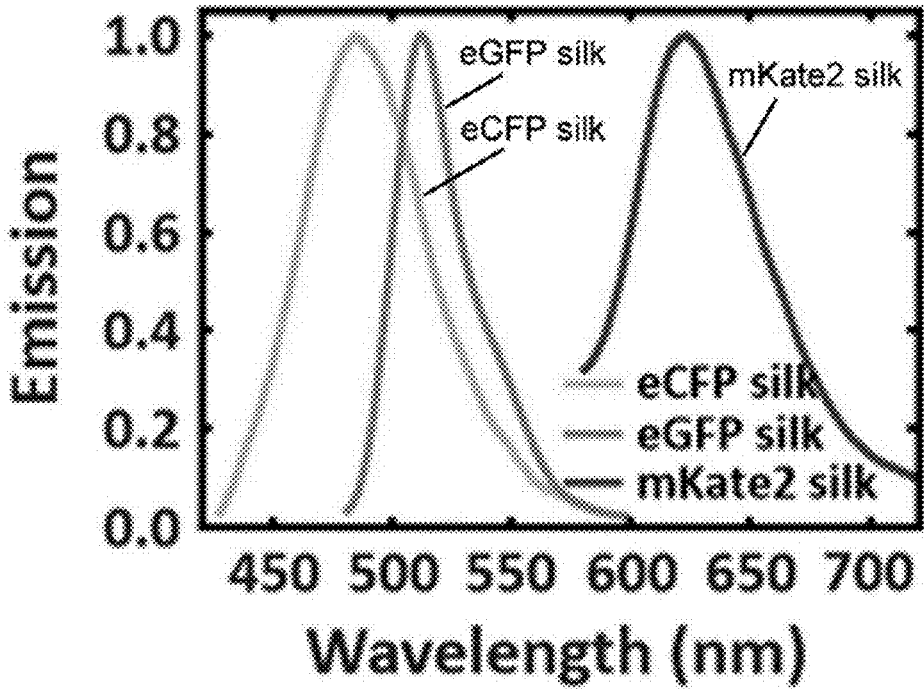
<FIG. 4C>
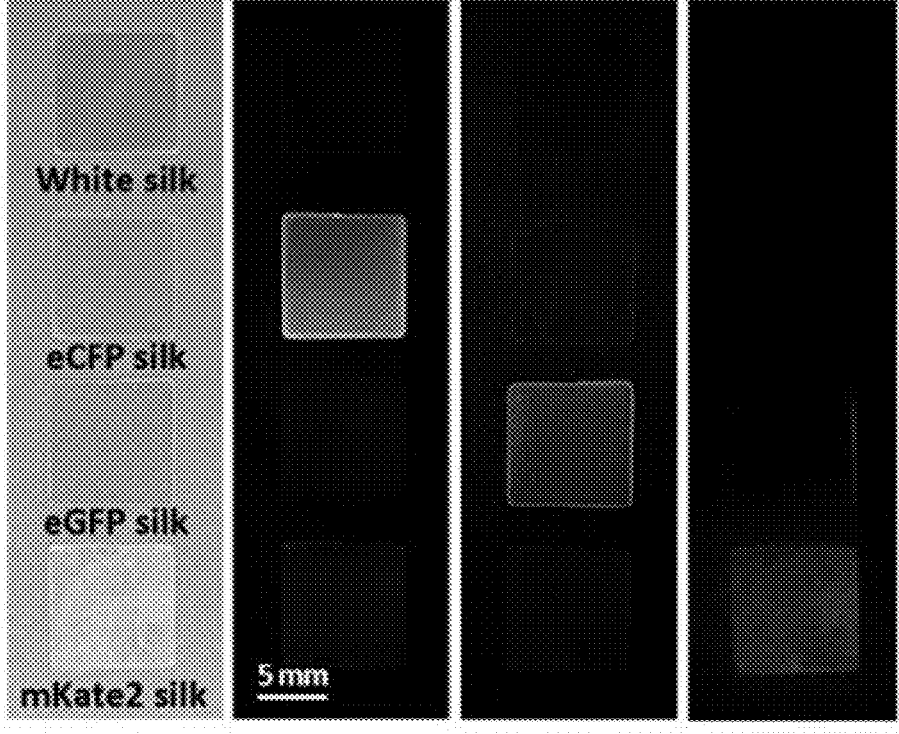

<FIG. 5A>
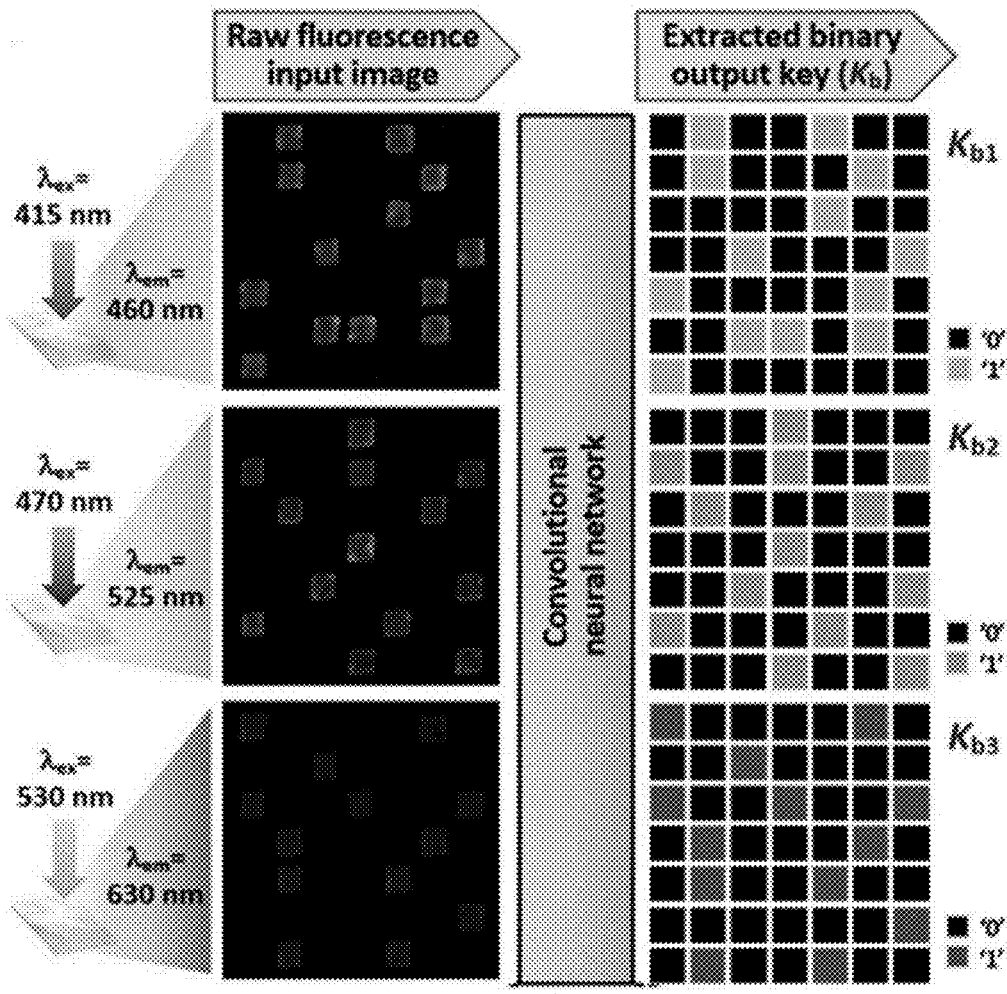
<FIG. 5B>
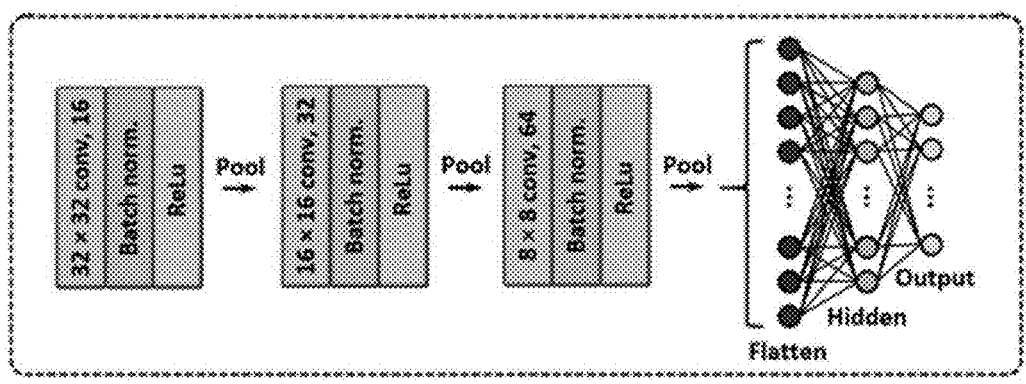

<FIG. 5C>
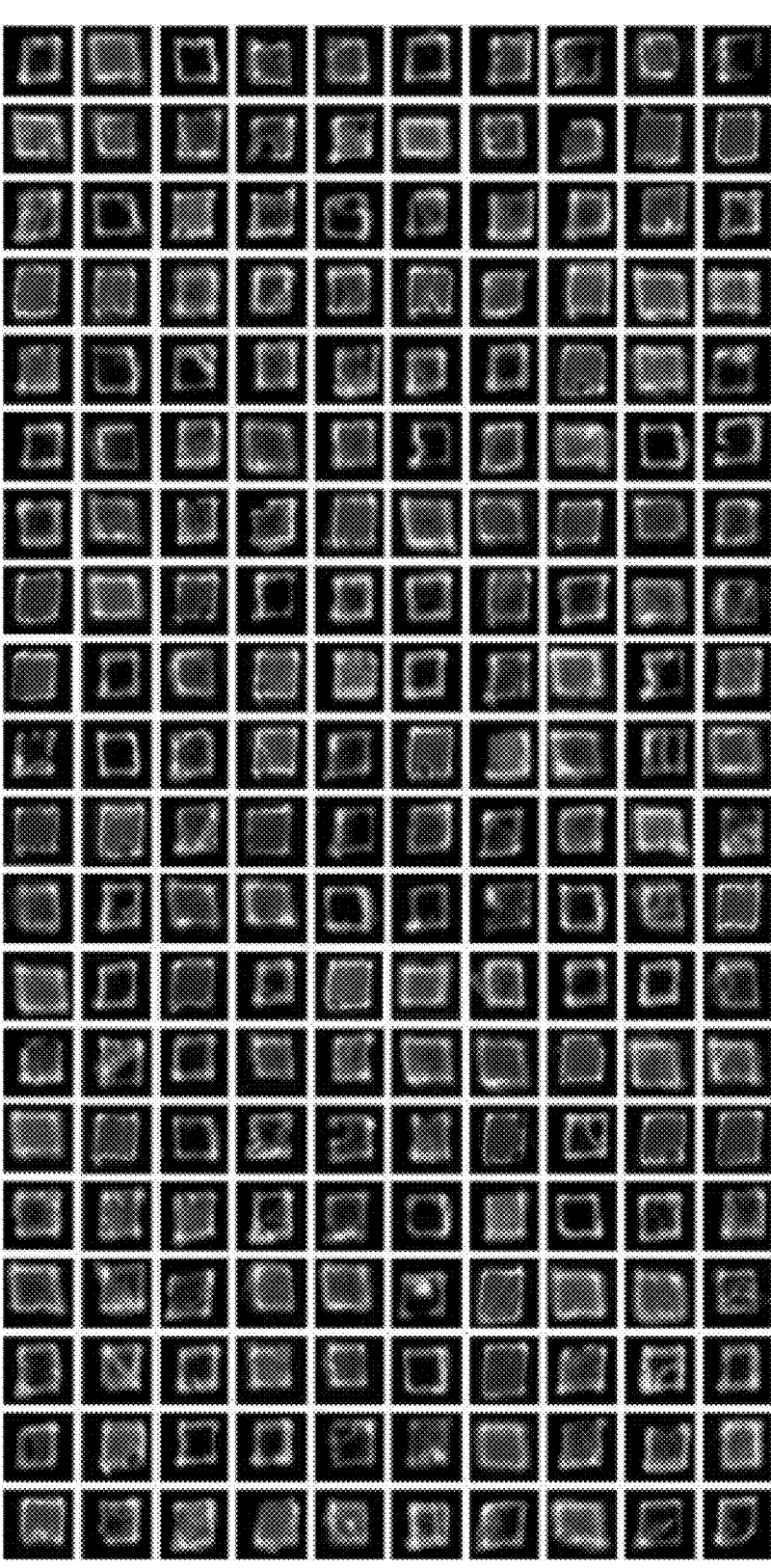

<FIG. 5D>
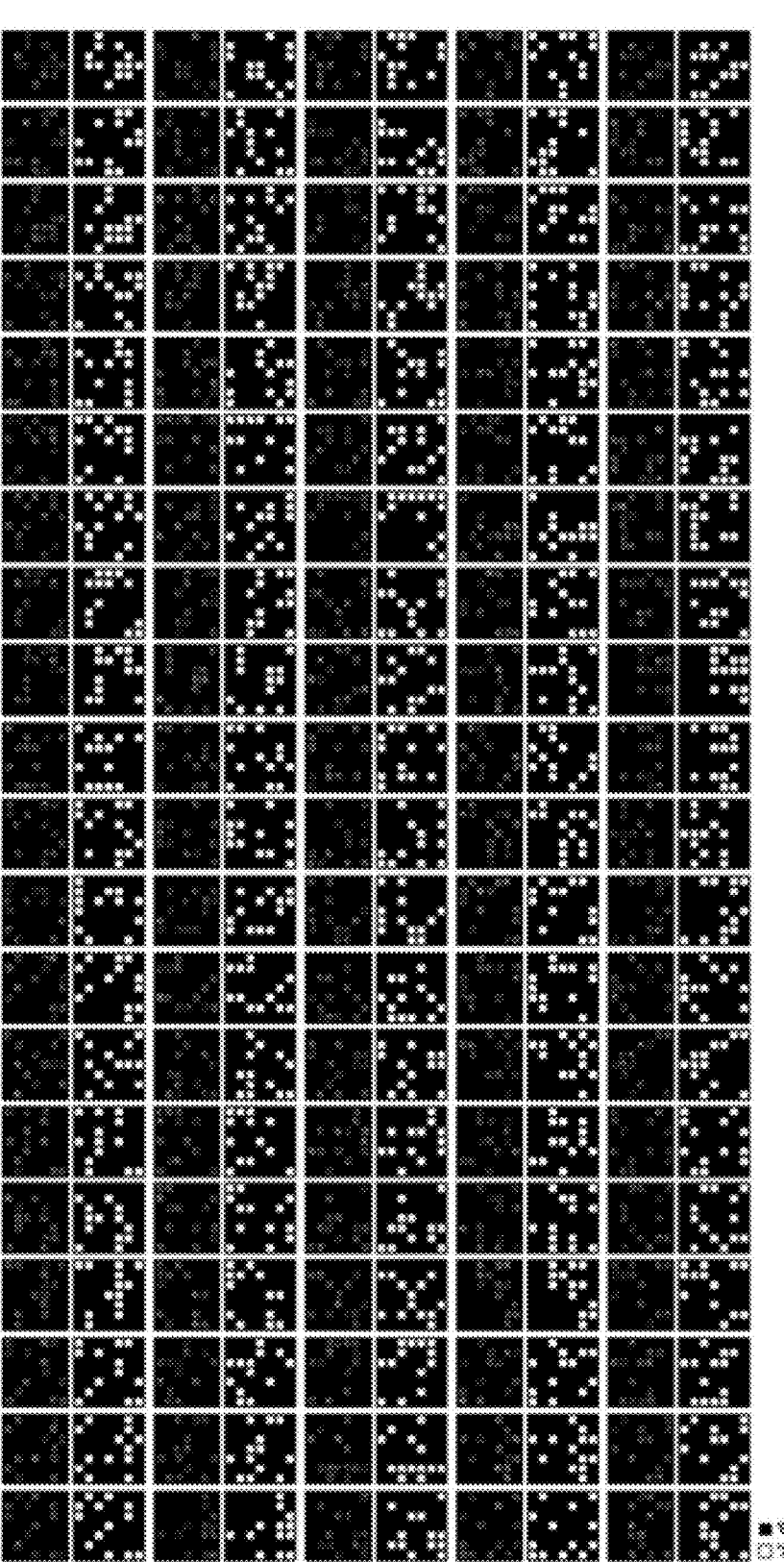

<FIG. 5E>
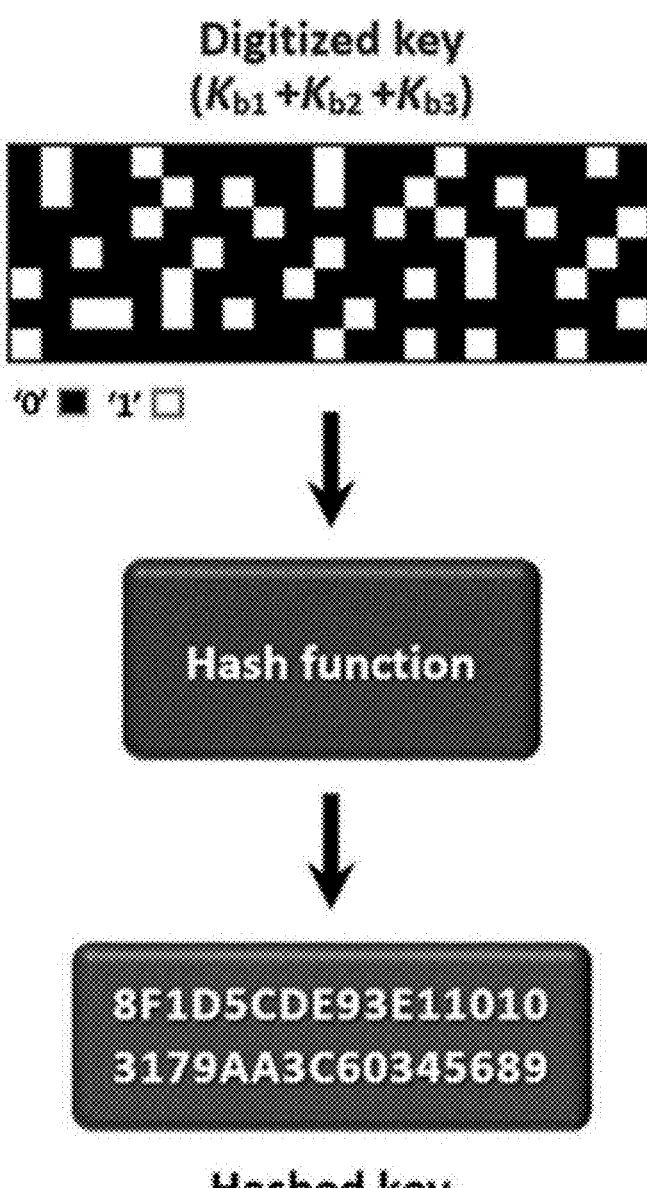

<FIG. 5F>
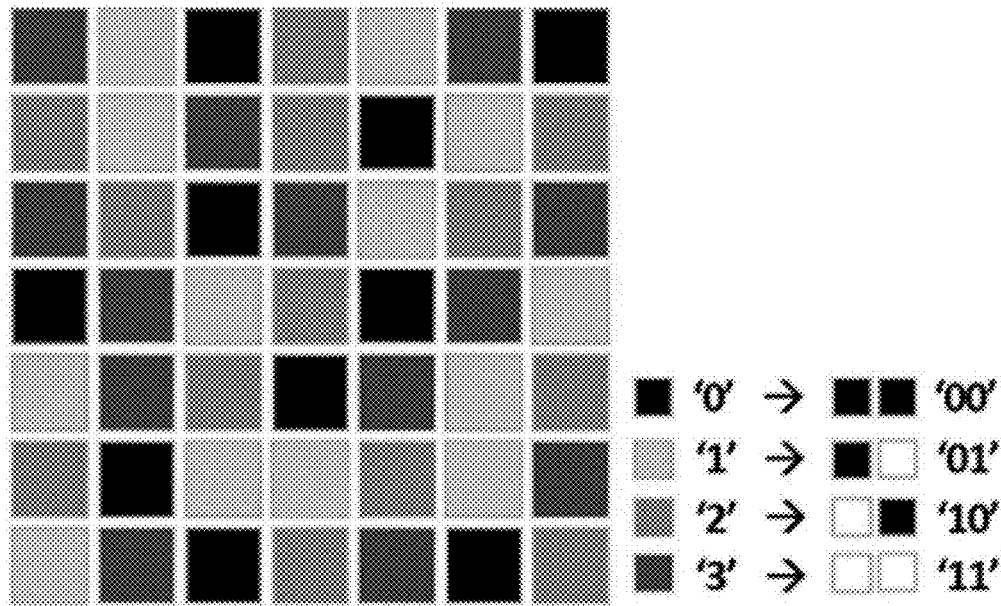
Quaternary key ($K_q$)
<FIG. 5G>
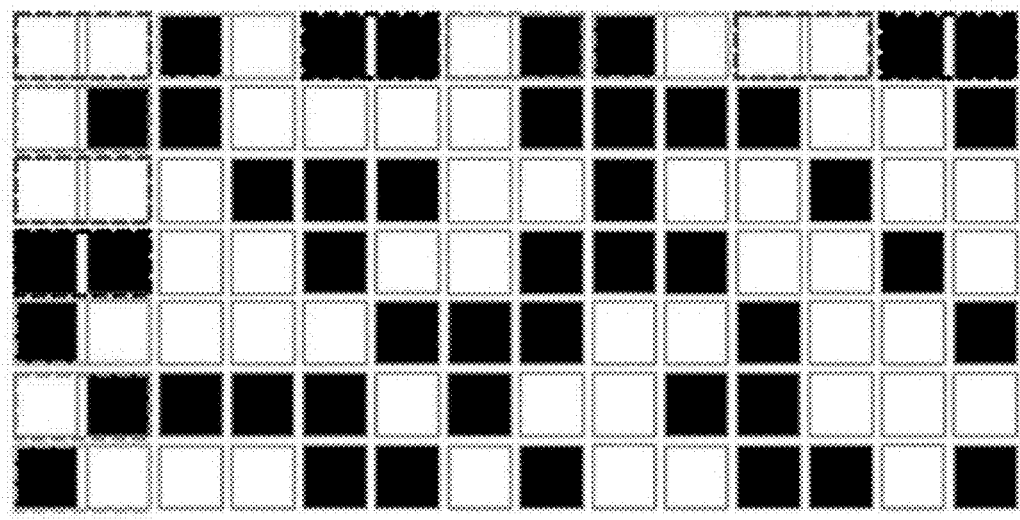
Double binary ($K_{db}$)

\<FIG. 6A\>
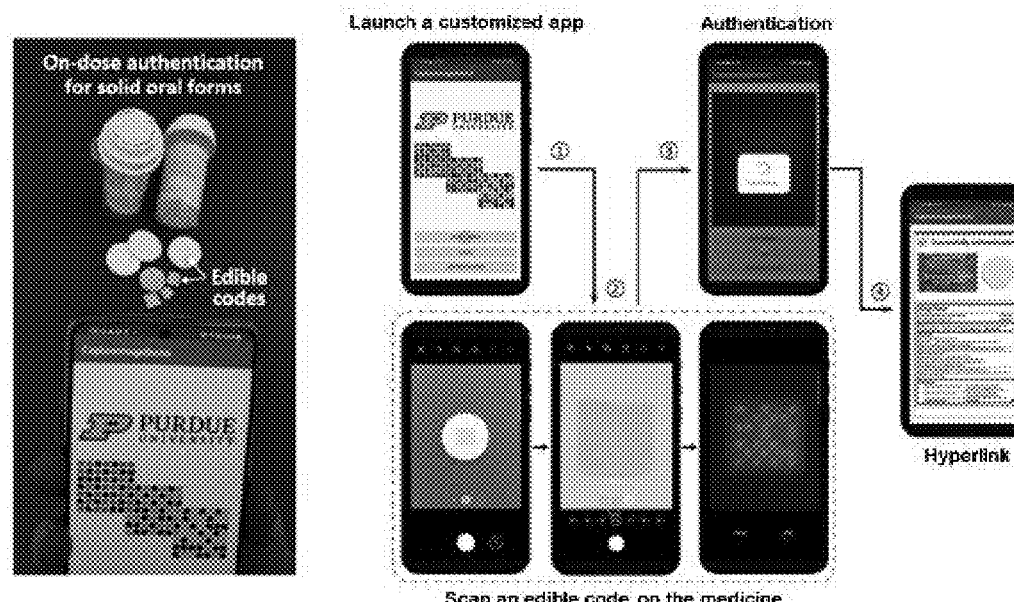
\<FIG. 6B\>
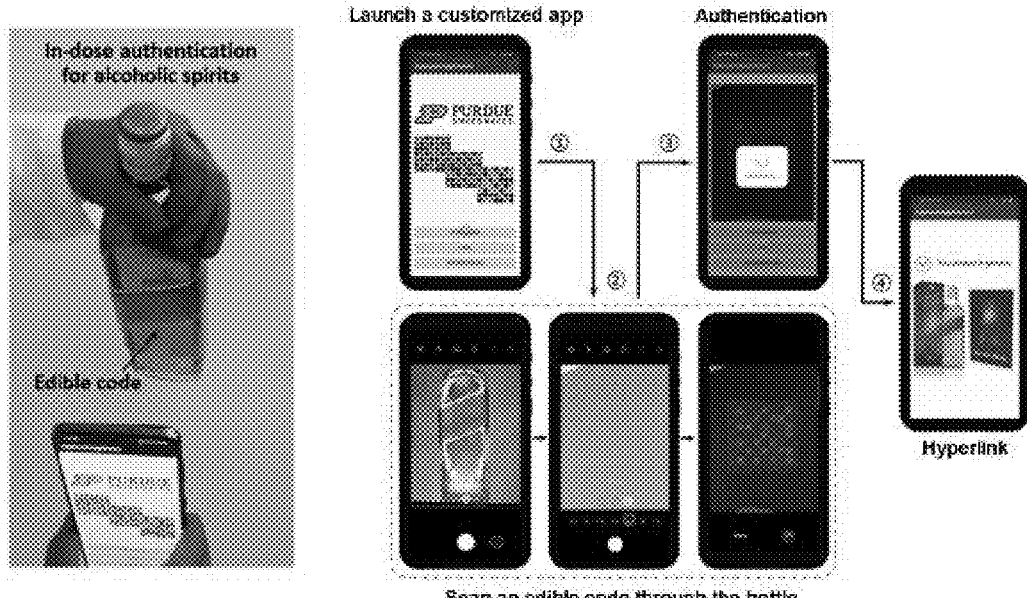

<FIG. 7>
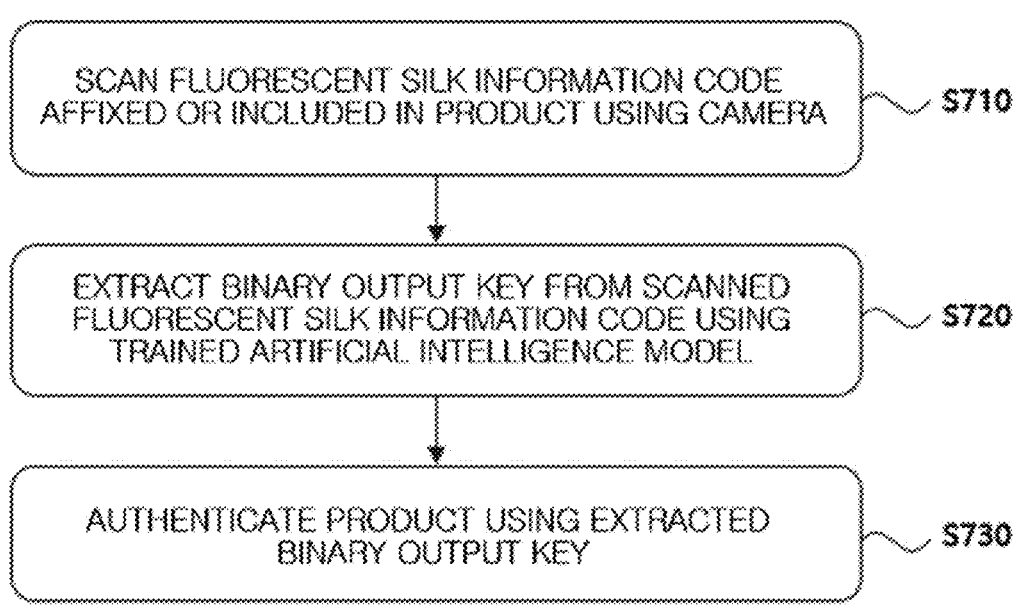
SCAN FLUORESCENT SILK INFORMATION CODE AFFIXED OR INCLUDED IN PRODUCT USING CAMERA    S710
EXTRACT BINARY OUTPUT KEY FROM SCANNED FLUORESCENT SILK INFORMATION CODE USING TRAINED ARTIFICIAL INTELLIGENCE MODEL    S720
AUTHENTICATE PRODUCT USING EXTRACTED BINARY OUTPUT KEY    S730
<FIG. 8>
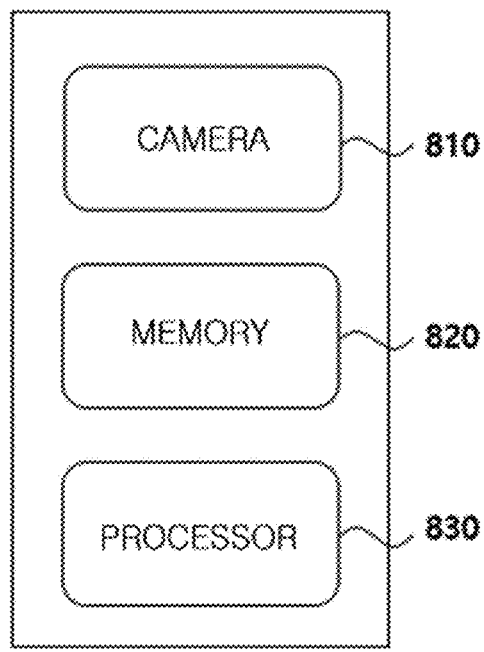
CAMERA    810
MEMORY    820
PROCESSOR    830

FLUORESCENT SILK INFORMATION CODE RECOGNIZING METHOD AND APPARATUS USING THE SAME

CROSS REFERENCE TO RELATED APPLICATIONS

This application is a U.S National Stage application of PCT/KR2023/004629, filed Apr. 5, 2023, which claims the benefit of priority to Korean Patent Application Nos. 10-2022-0043658 filed Apr. 7, 2022 and 10-2022-0076848 filed Jun. 23, 2022, all of which are incorporated by reference in their entireties herein.

TECHNICAL FIELD

The present invention relates to a fluorescent silk information code recognizing method and an apparatus using the same, and more particularly, to a method for recognizing a fluorescent silk information code using an AI and an apparatus using the same.

BACKGROUND ART

Generally, in order to protect brands and certify the integrity of products, a method of attaching information codes, such as barcodes, quick response (QR) codes, or holograms, onto products or packages is being used. In the case of food or medicine, most of materials which configure the information code may cause toxicity to the human body so that the information code is mainly represented on the package for certification rather than labeling the food or medicine with the information code. However, a package-level certification technique is easily copied, forged, and/or altered to be vulnerable to security. Recently, techniques are being developed to introduce the certification method to the medicine itself rather than the package level. For example, QR code drug labels, silica microtaggants, DNA taggants, polymer molecule encoding, isotope labeled excipients, multi-color nonpareil coatings, watermark bioprinting, and metal nanoparticle taggants are being used as all-in-one information codes of medicines. Further, various fluorescent materials including barcode microfibers using coumarin-6, rhodamine B dye microtaggants in polyethylene glycol, QR code capsules using upconverting fluorescent nanoparticles, dextran-modified 2-hydroxyethylmethacrylate polymer particles, and lysozyme supramolecular nanofilms are also actively used as materials for information codes with their unique optical properties to prevent counterfeit medicines. However, the exogenous and artificial additive materials used for these information codes may cause potentially hazardous and harmful (for example, carcinogenic and cytotoxic) consequences so that it is necessary to develop information codes which are safer for the human body and have a higher security.

In order to prevent the distribution of counterfeit/altered drugs, in the United States, products should be traceable to the product unit level by 2023 according to the Drug Supply Chain Security Act and in Europe, a product safety function needs to be implemented according to the Falsified Medicines Directive.

As one of the solutions in order to solve this problem, an information code which uses an edible fluorescent silk is being developed and a method for recognizing the information code and an apparatus for recognizing the same are also being developed.

DISCLOSURE

Technical Problem

Until today, technologies using tags or labels affixed onto the packages are mainly used to certify the genuine food or medicine. However, the package level certification technologies are easily copied, counterfeited, and/or altered. Further, the counterfeit/altered food or medicine is sold mainly through online, rather than offline so that it is difficult to crack down on them.

Food and medicine are directly related to the health and safety of users (consumers) so that the damage may be larger than the other counterfeit/altered products. For example, when the counterfeit/altered medicines are administrated to patients, the patients may suffer health deterioration or in severe cases, may die. This can erode trust in both the medicines and manufacturers, leading to significant economic losses for the pharmaceutical industry. Therefore, various methods for preventing counterfeit/altered food or medicine are being studied and, as one of them, an information code using edible fluorescent silk is being developed.

The present invention proposes a method for recognizing an information code using fluorescent silk and an apparatus using the same.

Technical Solution

According to an exemplary embodiment of the present invention, a method for recognizing a fluorescent silk information code includes a process of scanning a fluorescent silk information code which is affixed or included in a product, using a camera; a process of extracting a binary output key from the scanned fluorescent silk information code using a trained artificial intelligence model; and a process of authenticating the product using the extracted binary output key.

The method for recognizing a fluorescent silk information code according to the exemplary embodiment of the present invention further includes a process of displaying information about the authenticated product.

In the method for recognizing a fluorescent silk information code according to the exemplary embodiment of the present invention, the process of scanning a fluorescent silk information code which is affixed or included in a product, using a camera may be a process of scanning whether different colors are included in the fluorescent silk information code, using a plurality of filters.

In the method for recognizing a fluorescent silk information code according to the exemplary embodiment of the present invention, the plurality of filters is configured by a plurality set of excitation light source and an emission optical filter.

In the method for recognizing a fluorescent silk information code according to the exemplary embodiment of the present invention, the process of authenticating the product using the extracted binary output key includes: a process of adding a digital signature to the extracted binary output key; and a process of authenticating the product using the added digital signature.

In the method for recognizing a fluorescent silk information code according to the exemplary embodiment of the present invention, the digital signature is created using an encrypted hash algorithm.

In a computer readable recording medium which recognizes a fluorescent silk information code according to an exemplary embodiment of the present invention, a computer program which executes at least one of the above-described methods is recorded.

According to an exemplary embodiment of the present invention, an apparatus for recognizing a fluorescent silk information code includes a camera configured to scan a fluorescent silk information code affixed or included in a product; a memory configured to store a trained artificial intelligence model; and a processor configured to extract a binary output key from the fluorescent silk information code scanned by the camera using the trained artificial intelligence model and authenticate the product using the extracted binary output key.

Advantageous Effects

According to the present invention, an edible information code may be recognized.

According to the present invention, an error rate for recognizing the edible information code may be lowered.

According to the present invention, a defect during the manufacturing process of an edible information code may be overcome and the security may be enhanced.

According to the present invention, an information code is directly affixed to the food or medicine to determine whether the food or medicine is counterfeit/altered. By doing this, the distribution of the counterfeit/altered products is prevented to not only improve a level of public health such as national health and safety, but also create the economic benefits by securing trust between the manufacturers and consumers.

The method according to the present invention can be implemented as a program which is installed in a smartphone without a separate device so that the user may easily access and use the method with little difficulty.

DESCRIPTION OF DRAWINGS

FIG. 1 is an example illustrating a schematic diagram of creating a hash security key for authentication and digital signature from a fluorescent silk information code according to the present invention.

FIG. 2 is an example of a photograph and a fluorescence image of transgenic fluorescent silkworms and a silk gland of each silkworm using eCFP, eGFP, and mKate2 fluorescent proteins used to produce a fluorescent silk information code.

FIG. 3A is an example of a cross section of a fluorescent silk information code according to an exemplary embodiment and FIG. 3B is an example of various fluorescent silk information codes according to an exemplary embodiment.

FIGS. 4A and 4B illustrate the optical absorption and fluorescence emission spectra of a fluorescent silk information code according to an exemplary embodiment and FIG. 4C illustrates photographs and fluorescence images of three different fluorescent silk films and a white silk film using a specific set of an excitation light source and an emission optical filter.

FIG. 5A illustrates a process of extracting a binary output key from a fluorescent silk information code according to an exemplary embodiment of the present invention.

FIG. 5B illustrates an example of a two-dimensional convolutional neural network (2D CNN) described in FIG. 5A.

FIG. 5C illustrates an example of an individual image of a fluorescent silk information code used for 2D CNN learning of FIG. 5B.

FIG. 5D illustrates an example of a result of recognizing a virtual fluorescent silk information code using a trained 2D CNN.

FIG. 5E illustrates an example of adding a digital signature to a recognized binary output key according to an exemplary embodiment of the present invention.

FIGS. 5F and 5G illustrate an example of reconstructing a fluorescent silk information code according to an exemplary embodiment of the present invention.

FIGS. 6A and 6B illustrate an example of authenticating a fluorescent silk information code using an electronic apparatus according to an exemplary embodiment of the present invention.

FIG. 7 is an example of a flowchart of a method for recognizing a fluorescent silk information code according to an exemplary embodiment of the present invention.

FIG. 8 is an example of a diagram of an electronic apparatus for recognizing a fluorescent silk information code according to an exemplary embodiment of the present invention.

MODES OF THE INVENTION

Hereinafter, the exemplary embodiment is provided to just describe the present invention in more detail and it will be apparent to those skilled in the art that the scope of the present invention is not limited by the exemplary embodiments according to the gist of the present invention. It should be understood to include all changes, equivalents, or substitutes included in the spirit and the technical scope of the technology described below.

With regard to the terms used in the specification, unless the context apparently indicates otherwise, it should be understood that the terms "include" indicate that a feature, a number, a step, an operation, a component, a part or the combination thereof described in the specification is present, but do not exclude a possibility of presence or addition of one or more other features, numbers, steps, operations, components, parts or combinations thereof, in advance. A term of and/or includes a combination of a plurality of related elements or any one of the plurality of related elements.

When a method or an operating method is performed, processes/steps which constitute the method may be performed in a different order from the mentioned order unless a specific order is clearly mentioned in context. That is, the processes/steps may be performed in the order as described or simultaneously, or an opposite order.

FIG. 1 is an example illustrating a schematic diagram of creating a hash security key for authentication and digital signature from a fluorescent silk information code according to the present invention.

A fluorescent silk information codes expresses and stores information like other barcodes or matrix codes (for example, QR codes), but is produced using a plurality of natural fluorescent biopolymers to be edible and imperceptible and produce a multi-dimensional security key. Specifically, all the fluorescent silk information code may be constructed with proteins (for example, silk fibroins and fluorescent proteins). The fluorescent silk information code is individually affixed and incorporated into solid oral dosage type (for example, pills, tablets, or capsules) medicines, alcoholic spirits, and foods. The fluorescent silk information code may be sensed only using a set of an excitation light source and an emission optical filter so that a human cannot identify information of the fluorescent silk information code under normal circumstances. Several unique excitation-fluorescent emission combinations of the fluorescent silk information codes may improve an encoding capacity and an external attack (counterfeit/alter, copy, and hacking) resistance.

A user (for example, a patient) may read the fluorescent silk information code using an electronic apparatus (for example, a smartphone). The electronic apparatus applies an optical filter to a light source and a camera to acquire a raw fluorescent image. The electronic apparatus may use a deep neural network to quickly and accurately extract information from the acquired raw fluorescent image. For example, a two-dimensional convolutional neural network (2D CNN) may be used for image processing. Further, the deep neural network may overcome a defect of a pattern and a shape which may be caused during the manufacturing process of a fluorescent silk information code. The extracted information may be information which is encrypted using a hash function. Further, the user reads the fluorescent silk information code with the electronic apparatus to use the fluorescent silk information code for authentication of a dosage.

FIG. 2 is an example of a photograph and a fluorescence image of transgenic fluorescent silkworms and a silk gland of each silkworm using eCFP, eGFP, and mKate2 fluorescent proteins used to produce a fluorescent silk information code.

The fluorescent silkworm of FIG. 2 (eCFP, eGFP, and mKate2 fluorescent silkworm) may be produced by a generic fusion process of silk fibroin (or silkworm) and the fluorescent protein. A type of fluorescent protein includes an enhanced cyan fluorescent protein (eCFP), an enhanced green fluorescent protein (eGFP), and a far-red fluorescent protein (mKate2). However, it is not limited thereto. The eCFP fluorescent silk, the eGFP fluorescent silk, and the mKate2 fluorescent silk solutions and the corresponding films have cyan (or blue green), green, and red fluorescent emission colors and each requires an optical set of excitation and emission bands in the visible wavelength range. In FIG. 1, wavelengths of an excitation light source ($\lambda_{ex}$) and an optical emission filter ($\lambda_{em}$) for each fluorescent silk are as follows. For the eCFP fluorescent silk, $\lambda_{ex}$ is 415 nm and hem is 460 nm, for the eGFP fluorescent silk, $\lambda_{ex}$ is 470 nm and $\lambda_{em}$ is 525 nm, and for the mKate2 fluorescent silk, $\lambda_{ex}$ is 530 nm and $\lambda_{em}$ is 630 nm.

However, the present invention uses an information code like the fluorescent silk information code, but is not related to the information code itself so that a method for creating the information code will be omitted here.

FIG. 3A is an example of a cross section of a fluorescent silk information code according to an exemplary embodiment and FIG. 3B is an example of various fluorescent silk information codes according to an exemplary embodiment.

Referring to FIG. 3A, the fluorescent silk information code may be formed on a micro-grating patterned white silk film. Fluorescent colors representing information may not overlap each other and even though the fluorescent color (for example, a binary bit, 1) is not expressed from the fluorescent image of the information code obtained by the light excitation-light emission set, the information (for example, a binary bit, 0) may be represented. The fluorescent silk information code is affixed onto foods, medicines, and inside a bottle of alcoholic spirits to locate the micro grating pattern on an outermost layer.

Referring to FIG. 3B, a size of the fluorescent silk information code and the number of matrices included in the fluorescent silk information code may vary. For example, in an individual square code size of 700×700 μm², sizes of taggants (tags) having 5×5, 7×7, and 9×9 matrix information codes may be 7×7, 9×9, and 11×11 mm², respectively.

6

Further, an encoding capacity may vary depending on the number of matrices of the fluorescent silk information code. The encoding capacity cs is defined by a number of output codes and responses which may be output by the input pattern and c indicates a type of bits (in the case of binary bit, c=2) and s indicates a key size (the bit number).

A size of the fluorescent silk information code taggant (tag) may be changed by controlling the number of matrix codes so that in the case of 5×5 matrix information code, each fluorescent color code has 25 binary bits and is configured by three fluorescent color codes. Therefore, an encoding capacity of 5×5 matrix information code may be $2^{75}$ (=3.77×10²²), an encoding capacity of 7×7 matrix information code may be $2^{147}$ (=1.78×10⁴⁴), and an encoding capacity of 9×9 matrix information code may be $2^{243}$ (=1.41×10⁷³).

FIGS. 4A and 4B illustrate the optical absorption and fluorescence emission spectra of a fluorescent silk information code according to an exemplary embodiment and FIG. 4C illustrates photographs and fluorescence images of three different fluorescent silk films from each other and a white silk film using a set of an excitation light source and an emission optical filter.

Specifically, FIGS. 4A and 4B illustrate an optical absorption and a fluorescence emission spectrum of each fluorescent silk film which is produced using eCFP fluorescent silk (cyan), eGFP fluorescent silk (green), and mKate2 fluorescent silk (red) solutions which are reproduced, and FIG. 4C illustrates photographs and fluorescence images of three different fluorescent silk films from each other and a white silk film using a set of excitation light source and emission optical filter. The wavelengths of an excitation light source ($\lambda_{ex}$) and an optical emission filter ($\lambda_{em}$) for each fluorescent silk are different from each other and in the case of the eCFP fluorescent silk, $\lambda_{ex}$ is 415 nm and $\lambda_{em}$ is 460 nm, in the case of the eGFP fluorescent silk, $\lambda_{ex}$ is 470 nm and $\lambda_{em}$ is 525 nm, and in the case of the mKate2 fluorescent silk, $\lambda_{ex}$ is 530 nm and $\lambda_{em}$ is 630 nm. An average thickness of the used silk film herein is 70 μm.

FIG. 5A illustrates a process of extracting a binary output key from a fluorescent silk information code according to an exemplary embodiment of the present invention.

Referring to FIG. 5A, the raw fluorescent image may be obtained by the camera, from the fluorescent silk information code. An optical excitation and emission filter set is applied to the camera and different filter sets may be applied to individual fluorescent silks. For example, $\lambda_{ex}$=415 nm and $\lambda_{em}$=460 nm may be applied to eCFP silk, $\lambda_{ex}$=470 nm and $\lambda_{em}$=525 nm may be applied to eGFP silk, and $\lambda_{ex}$=530 nm and $\lambda_{em}$=630 nm may be applied to mKate2 silk. The raw fluorescent image acquired as described above may be converted into a binary bitmap (an output key) using an artificial intelligence model. For example, the artificial intelligence model may be a two-dimensional convolutional neural network (2D CNN) method. Hereinafter, the 2D CNN will be described, but the present invention is not limited thereto.

When the image is processed using the 2D CNN, as compared with another image processing method, even though there is a problem in that a shape of the micro-size square silk film (for example, 70×70 μm²) which may be generated during the manufacturing of the fluorescent silk information code is irregular, an error when the fluorescent silk information code is recognized (or, when the binary key is extracted) may be reduced.

FIG. 5B illustrates an example of a 2D CNN model which has been described in FIG. 5A.

Referring to FIG. 5B, the 2D CNN (or 2D CNN model) is configured by three convolutional layers and two fully connected layers. In the following Table 1, an example of a hyper parameter of the 2D CNN for recognizing a fluorescent silk information code is represented.

TABLE 1

| Layer | Component | Size |
|---|---|---|
| Input layer | Raw fluorescence image | 692 × 648 × 1 |
| 1$^{st}$ convolutional layer | 32 × 32 convolution, 16 filters, stride 2 | 331 × 309 × 16 |
| | Batch normalization | |
| | ReLU$^{a)}$ activation | |
| | 32 × 32 max pooling, stride 2 | 150 × 139 × 16 |
| 2$^{nd}$ convolutional layer | 16 × 16 convolution, 32 filters, stride 1 | 135 × 124 × 32 |
| | Batch normalization | |
| | ReLU activation | |
| | 16 × 16 max pooling, stride 2 | 60 × 55 × 32 |
| 3$^{rd}$ convolutional layer | 8 × 8 convolution, 64 filters, stride 1 | 53 × 48 × 64 |
| | Batch normalization | |
| | ReLU activation | |
| | 8 × 8 max pooling, stride 2 | 23 × 21 × 64 |
| Fully-connected layer | 400 nodes | 1 × 1 × 400 |
| | ReLU activation | |
| Output layer | 49 nodes (49-bit output key) | 1 × 1 × 49 |

$^{a)}$ReLU: Rectified Linear Unit

Referring to Table 1, the first convolutional layer of the 2D CNN is configured by 16 filters with a size of 32×32 and two strides, and the second convolutional layer is configured by 32 filters with a size of 16×16 and one stride. A third convolutional layer is configured by 64 filters with a size of 8×8 and one stride. For faster and stable training, batch normalization is applied to each convolutional layer. After the batch normalization, a rectified linear unit (ReNU) activation function is applied to perform max pooling. After performing the max pooling, pooling sizes of 32×32, 16×16, and 8×8 are applied to first, second, and third convolutional layers, respectively, with two strides. After a flattening step, two fully connected layers are configured. The batch normalization and ReLU activation are applied to the first layer with 400 nodes and the second layer with 49 nodes returns 49-bit output key to the 7×7 matrix code. The 2D CNN was trained with a mean absolute error for up to 15 epochs. The ADAM optimization was used for network training, an initial learning rate was set to 2×10$^{-4}$, and a mini batch size was set to 100.

The 2D CNN was trained so as to sense an area filled with a square as "1" and an empty area as "0" in the matrix array so that when the fluorescent emission color image is input, a binary output key K$_b$ may be output as a result.

FIG. 5C illustrates an example of an individual image of a fluorescent silk information code used for 2D CNN learning of FIG. 5B.

In order to train the 2D CNN, 200 individual square code images acquired a square unit (each square unit code image size=101 pixels×101 pixels) from the fluorescent silk information code. A virtual fluorescent silk information code fluorescent image has a 7×7 matrix array (each image size=692 pixels×648 pixels) format. Images of the individual square codes of FIG. 5C are randomly selected to use 9494 different fluorescent silk information code fluorescent images from each other as a 2D CNN training data set.

FIG. 5D illustrates an example of a result of recognizing a virtual fluorescent silk information code using a trained 2D CNN.

Referring to FIG. 5D, in order to quantitatively verify the 2D CNN, as a result of extracting a result recognized by inputting 50000 virtual fluorescent silk information code (7×7 matrix) fluorescent images to the trained 2D CNN with a binary output key, the bit error rate was very low to be 1.62×10$^{-4}$.

FIG. 5E illustrates an example of adding a digital signature to a recognized binary output key according to an exemplary embodiment of the present invention.

The digital signature may support secure authentication and ensure data integrity. The digital signature may be created using a hash function. For example, an encryption hash algorithm (for example, MD5, SHA-250, or SHA-512) is applied to the recognized binary output key (digitized key) to create a hashed key. The hashed key generated as described above may be used to validate, verify, and certify individual medicines.

FIGS. 5F and 5G illustrate an example of reconstructing a fluorescent silk information code according to an exemplary embodiment of the present invention.

Referring to FIG. 5F, a fluorescent silk information code with four components may be configured using three fluorescent silk having different fluorescent colors from each other. For example, cyan may be denoted by 1, green by 2, red by 3, and black by 0, respectively. An encoding capacity of 7×7 (49) matrix fluorescent silk information code may be 4$^{49}$ (=3.16×10$^{29}$).

FIG. 5G illustrates FIG. 5F as a double binary key. That is, cyan, green, red, and black are represented by double binary keys, such as 01, 10, 11, and 00, respectively. The encoding capacity of the double binary key may be 2$^{98}$ (=3.16×10$^{29}$). The double binary key distinguishes four states using two bits and consequently, generates a larger (twice) binary bit sequence.

FIGS. 6A and 6B illustrate an example of authenticating a fluorescent silk information code using an electronic apparatus according to an exemplary embodiment of the present invention.

Referring to FIG. 6A, the fluorescent silk information code may be affixed on an orally administered tablet type medicine and the electronic apparatus may be a smartphone. The electronic apparatus may require installing a separate software (or a program or an application) to authenticate the fluorescent silk information code. The software installed in the electronic apparatus scans the fluorescent silk information code using a camera and a light source (a flash LED) to extract a binary output key. The electronic apparatus generates a hash key using the extracted binary output key to perform an authentication process (digital signature). Further, the electronic apparatus may also open a link for a web page to display dosage information. The electronic apparatus may further display product data (for example, a dosage strength, a dosing frequency, precautions, and an expiration date), manufacturing details (for example, location, date, placement, and lot number), and a distribution channel (for example, country, a distributor, and a wholesaler).

Referring to FIG. 6B, the fluorescent silk information code may be included in the alcoholic spirit to authenticate the alcoholic spirit. A consumer may authenticate the fluorescent silk information code by scanning the code inside glass bottle using the electronic apparatus without separately opening the bottle, thereby authenticating the alcoholic spirit. When the fluorescent silk information code is authenticated, the electronic apparatus may display product data (for example, a type, ingredients, an alcohol content, and precautions), manufacturing details (for example, a location, a date, and a serial number), and a distribution channel (for example, a country, a distributor, and a wholesaler). A method for authenticating the fluorescent silk information code may be equal to or similar to those described in FIG. 6A.

FIG. 7 is an example of a flowchart of a method for recognizing a fluorescent silk information code according to an exemplary embodiment of the present invention.

According to a method for recognizing a fluorescent silk information code according to an exemplary embodiment of the present invention, a fluorescent silk information code which is affixed or included in a product may be scanned using a camera (S710). A plurality of filters may be affixed to the camera so that a plurality of fluorescent silk information codes may be scanned. When a plurality of filters is used, the electronic apparatus may confirm whether a specific color is included in the fluorescent silk information code using each filter. The plurality of filters may be configured by a set of an excitation light source and an emission optical filter.

According to the method for recognizing a fluorescent silk information code according to an exemplary embodiment of the present invention, a binary output key may be extracted from the fluorescent silk information code scanned using the trained artificial intelligence model (S720). For example, the trained artificial intelligence model may be a 2D CNN.

According to the method for recognizing a fluorescent silk information code according to an exemplary embodiment of the present invention, a product may be authenticated using the extracted binary output key (S730). According to the method for recognizing a fluorescent silk information code, a digital signature is added to the extracted binary output key and the product may be authenticated using the added digital signature. The digital signature may be created using an encrypted hash algorithm (for example, MD5, SHA-256, or SHA-512).

According to the method for recognizing a fluorescent silk information code according to an exemplary embodiment of the present invention, information about the authenticated product may be further displayed. For example, when the product is an orally administered tablet type medicine, at least some of product data (for example, a dosage strength, a dosing frequency, precautions, and an expiration date), manufacturing details (for example, location, date, placement, and lot number), and a distribution channel (for example, country, a distributor, and a wholesaler) may be further displayed. When the product is an alcohol spirit, at least some of product data (for example, a type, ingredients, an alcohol content, and precautions), manufacturing details (for example, a location, a date, and a serial number), and a distribution channel (for example, a country, a distributor, and a wholesaler) may be further displayed.

FIG. 8 is an example of a diagram of an electronic apparatus for recognizing a fluorescent silk information code according to an exemplary embodiment of the present invention.

Referring to FIG. 8, the electronic apparatus which recognizes a fluorescent silk information code may be configured by a camera 810, a memory 820, and a processor 830.

The camera 810 may scan a fluorescent silk information code which is affixed or included in the product. The camera 810 may include a plurality of filters.

In the memory 820, the trained artificial intelligence model may be stored. The trained artificial intelligence model may be a 2D CNN.

The processor 830 extracts a binary output key from a fluorescent silk information code scanned by a camera using the trained artificial intelligence mode and may authenticate the product using the extracted binary output key. The processor 830 may further display information about the authenticated product on a display. For example, when the product is an orally administered tablet type medicine, at least some of product data (for example, a dosage strength, a dosing frequency, precautions, and an expiration date), manufacturing details (for example, location, date, placement, and lot number), and a distribution channel (for example, country, a distributor, and a wholesaler) may be further displayed. When the product is an alcohol spirit, at least some of product data (for example, a type, ingredients, an alcohol content, and precautions), manufacturing details (for example, a location, a date, and a serial number), and a distribution channel (for example, a country, a distributor, and a wholesaler) may be further displayed.

The processor 830 adds a digital signature to the extracted binary output key and may authenticate a product using the added digital signature. The digital signature may be created using an encrypted hash algorithm (for example, MD5, SHA-256, or SHA-512).

Even though it is described that the electronic apparatus for recognizing a fluorescent silk information code is configured by the camera 810, the memory 820, and the processor 830, a plurality of configurations may also form one configuration, or one configuration may also be configured by a plurality of configurations. In addition, the electronic apparatus for recognizing a fluorescent silk information code may further include an excitation light source (for example, a flash LED), a communication module, and a display.

Although the specific part of the present invention has been described in detail, it is obvious to those skilled in the art that such a specific description is just a preferred embodiment, and the scope of the present invention is not limited thereby. Thus, the substantial scope of the present invention will be defined by the appended claims and equivalents thereof.

The invention claimed is:

1. A method for recognizing a fluorescent silk information code, comprising:
  a process of scanning a fluorescent silk information code which is affixed or included in a product, using a camera;
  a process of extracting a binary output key from the scanned fluorescent silk information code using a trained artificial intelligence model; and
  a process of authenticating the product using the extracted binary output key.

2. The method for recognizing a fluorescent silk information code according to claim 1, further comprising:
  a process of displaying information about the authenticated product.

3. The method for recognizing a fluorescent silk information code according to claim 1, wherein the process of scanning a fluorescent silk information code which is affixed or included in a product, using a camera comprises:
  a process of scanning whether different colors are included in the fluorescent silk information code, using a plurality of filters.

4. The method for recognizing a fluorescent silk information code according to claim 3, wherein the plurality of filters has a plurality of excitation light source and emission optical filter sets.

5. The method for recognizing a fluorescent silk information code according to claim 1, wherein the process of authenticating the product using the extracted binary output key comprises:

a process of adding a digital signature to the extracted binary output key; and a process of authenticating the product using the added digital signature.

6. The method for recognizing a fluorescent silk information code according to claim 5, wherein the digital signature is created using an encrypted hash algorithm.

7. A computer readable recording medium in which a computer program executing the method of claim 1 is recorded.

8. An electronic apparatus for recognizing a fluorescent silk information code, comprising:

a camera configured to scan a fluorescent silk information code affixed or included in a product;

a memory configured to store a trained artificial intelligence model; and a processor configured to extract a binary output key from the fluorescent silk information code scanned by the camera using the trained artificial intelligence model and authenticate the product using the extracted binary output key.

\* \* \* \* \*